May 31, 1949. E. NICHOLSON 2,471,972
APPARATUS FOR HEATING AIR
Filed Nov. 8, 1946

INVENTOR.
Emmett Nicholson
BY

Patented May 31, 1949

2,471,972

UNITED STATES PATENT OFFICE 2,471,972

APPARATUS FOR HEATING AIR

Emmett Nicholson, Dunedin, Fla.

Application November 8, 1946, Serial No. 708,514

4 Claims. (Cl. 219—38)

My invention relates to an improved heating unit that can be used with any suitable portable supporting frame, or installed in the circulating type of cabinet where two or more units will provide clean and efficient heat that is ample for the average home.

An object of the invention is to provide a heating unit that uses all of the radiated heat delivered by the heating element to heat the air that passes thru the heating unit.

Yet another object of my invention is to provide a low cost heater with a replaceable heating element, that can be purchased from most local vendors, thus keeping the heater in operating condition.

Still another object of my invention is to provide an efficient method of heating any type of home with individual room heaters that will not overload the average electrical circuit. Or by using two or more heating units in a circulating heating cabinet, adequate heat can be provided for the average home.

With these and other objects in view, which may be incident to my improvements, the invention consists in the parts and combinations to be hereinafter set forth and claimed with the understanding that the several necessary elements comprising my invention may be varied in the construction, proportions and arrangement without departing from the spirit and scope of the applied claims.

In order to make my invention more clearly understood, I have shown in the accompanying drawings, means for carrying the same in practical effect without limiting the improvements in their useful application to the particular construction which for the purpose of explanation have been made the subject of illustration.

My improved heating unit consists essentially of a combination of vertically disposed metal plates, separated with metal separators to provide an air space between the plates, and a heating element which is arranged at right angle to the plates, thru holes provided in the center of the plates. One of the most important features of my invention is to utilize all of the radiated heat generated and released by the heating element to heat the metal plates by radiation without having the metal plates fixed to or in contact with the heating element. This permits the use of a standard heating element that can be replaced when necessary. The hole in the front plate thru which the heating element passes is slightly larger than the heating element. This is to hold the heating unit in position so that it cannot sag or come in contact with any of the plates.

Figure 1:
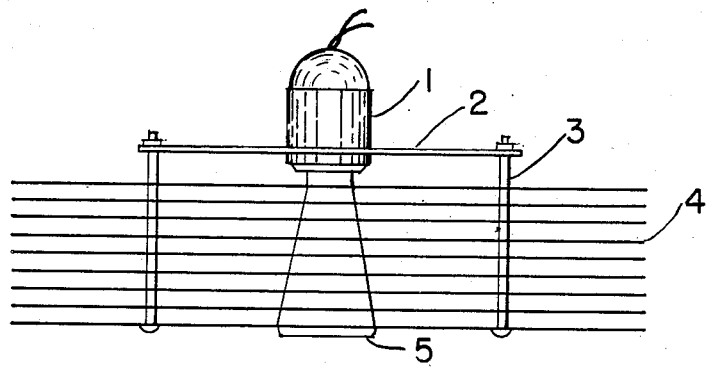
Figure 1 is a top view looking down upon the heating unit.
Figures 2, 3:
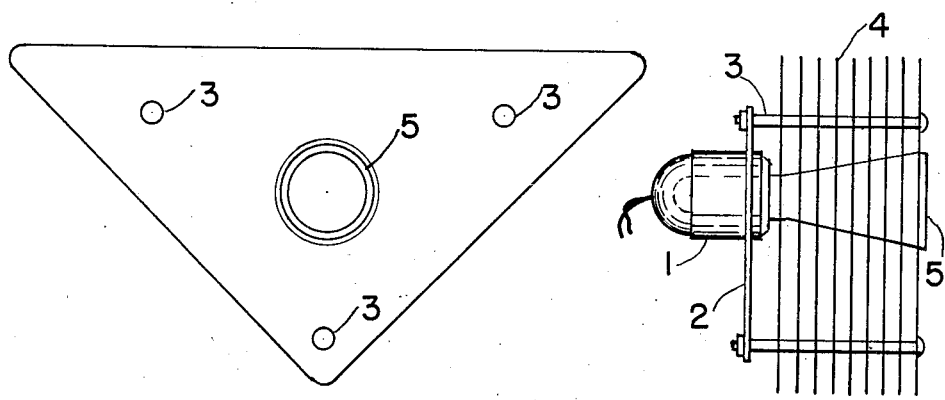
Figure 2 is an elevational view showing the heating element located in the center of the plates.
Figure 3 is a side elevation further indicating the method of construction.
Figure 4:
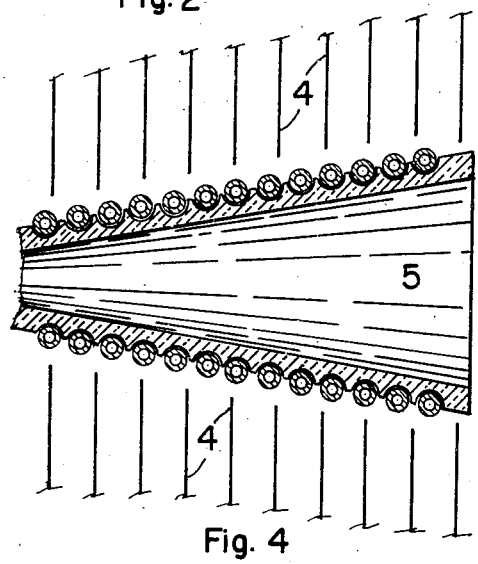
Figure 4 is a fragmentary section showing the relation between the plates and the heating element.

Referring to the drawings and more particularly Figures 1, 2 and 3 thereof, I have shown my improved heating unit, comprising the plates 4 assembled with the separators and bolts 3 on the vertical supporting plate 2 which also supports the heating element socket or receptacle 1 into which the heating element 5 is screwed or plugged. Figure 4 which is a fragmentary section of the heating element 5 and the plates 4, shows how the plates 4 are cut out in the center so as to permit the heating element 5 to extend thru these openings and be secured to the supporting plate 2 without coming in contact with any of the plates 4. As shown, the heating element 5 may consist of an elongated helical resistance coil wound upon a refractory core, in a well known manner. While the convolutions of the coil do not come in contact with the plates 4, they are located in close proximity to the edges of the openings in the plate, as clearly shown in Fig. 4, so that the plates are effectively heated by radiation from the coil. The plate 4 farthest from the supporting plate 2 and called the front plate has the hole in the center thru which the heating element passes, constructed so as to support the core of the heating element so it cannot sag or bring the heating coil in contact with any of the plates 4.

In operation the heat developed by the heating element 5 is transferred to the plates 4 by radiation. The metal plates 4 being constructed of a material of high conductivity become very hot thruout their entire area. This creates powerful convection currents of air flowing upwardly around the heating element and between the spaced, vertical plates. The plates 4 are shown as an isosceles triangle erected with the base or longest side on top with the two equal sides extending diagonally upward from the apex underneath or in other words the isosceles triangle is inverted. This arrangement of the plates 4 with diagonally disposed lower edges induces a maximum amount of air to pass upward thru the openings between the plates 4. The heat radiated by the heating element 5 radiates in all directions. Thus there is considerable radiation downward and outward which to quite a degree preheats the air moving upward thru the space between the plates 4 delivering warm air to the heating unit without chilling of the plates 4 or heating element 5.

In testing my invention in actual operation the following results were observed. The flow of air upward thru the openings between the plates checked by an instrument was found to be in still air 142 cu. ft. per minute, the temperature 12" above the unit was 180 degrees F. and at the sides in line with points of the triangle the temperature was 160 degrees F. These tests were made with a 660 watt electric heating element such as used in the so called bowl type reflecting heaters, and as indicated by the numeral 5 on the drawings. The flow of air is by natural draft or convection and without the use of any device to accelerate the movement of the air thru the heating unit.

I claim as my invention:

1. An air heater comprising a series of spaced, parallel, vertically disposed metal plates having registering openings formed therein, and an electric heating element comprising an elongated helical coil extending axially through the openings in substantially all of said plates.

2. An air heater comprising a series of spaced, parallel, vertically disposed metal plates having registering openings formed therein, and an electric heating element comprising an elongated helical coil extending at right angles to said plates axially through said openings, said coil substantially filling said openings so that the convolutions thereof lie in close proximity to the edges of said openings.

3. An air heater comprising a series of spaced, parallel, vertically disposed metal plates having registering openings formed therein, and an electric heating element comprising an elongated helical coil extending at right angles to said plates axially through said openings, said coil substantially filling said openings so that the convolutions thereof lie in close proximity to the edges of said openings, the lower edges of said plates extending diagonally upward and diverging from a point immediately beneath said openings.

4. An air heater comprising a vertically disposed supporting plate, an electric socket carried thereby, an elongated heating element removably mounted in said socket, and a series of spaced, parallel metal plates supported by said supporting plate in parallel relation therewith, said plates having registering openings through which said heating element extends, the edges of said openings being out of contact with but disposed in close proximity to said heating element.

EMMETT NICHOLSON.

REFERENCES CITED

The following references are of record in the file of this patent:

UNITED STATES PATENTS

| Number | Name | Date |
|---|---|---|
| 1,863,882 | Scharf | June 21, 1932 |
| 1,879,140 | Edwards | Sept. 27, 1932 |
| 1,989,862 | Horstmann | Feb. 5, 1935 |
| 2,256,049 | Gallup | Sept. 16, 1941 |
| 2,276,144 | Bergstrom | Mar. 10, 1942 |